United States Patent [19]

Zieke

[11] Patent Number: 5,022,530

[45] Date of Patent: Jun. 11, 1991

[54] MODIFIED ZIPPER ELEMENTS FOR EASY OPEN CONTAINERS

[75] Inventor: Larry M. Zieke, Midland, Mich.

[73] Assignee: The Dow Chemical Company, Midland, Mich.

[21] Appl. No.: 421,255

[22] Filed: Oct. 13, 1989

[51] Int. Cl.$^5$ .............................................. B65D 33/34
[52] U.S. Cl. ...................................... 206/618; 383/85
[58] Field of Search ............... 206/605, 604, 616, 617, 206/618; 383/85

[56] References Cited

U.S. PATENT DOCUMENTS 3,198,228  8/1965  Naito .
3,371,696  3/1968  Ausnit .
3,543,343  12/1970 Staller et al. .
3,780,781  12/1973 Uramoto .
3,827,472  8/1974  Uramoto .
4,589,145  5/1986  Van Eiden et al. .
4,615,045  9/1986  Siegel .
4,812,074  3/1989  Ausnit et al. .
4,846,585  7/1989  Boeckmann et al. .

Primary Examiner—Joseph Man-Fu Moy
Attorney, Agent, or Firm—Killworth, Gottman, Hagan & Schaeff

[57] ABSTRACT

An easy open, recloseable flexible container having interlocking zipper elements and a tear strip for opening the container along the upper edge, wherein the bases of the zipper elements are extended upward towards the tear strip to limit the area of tearing and protect the zipper elements, and method for making.

42 Claims, 4 Drawing Sheets

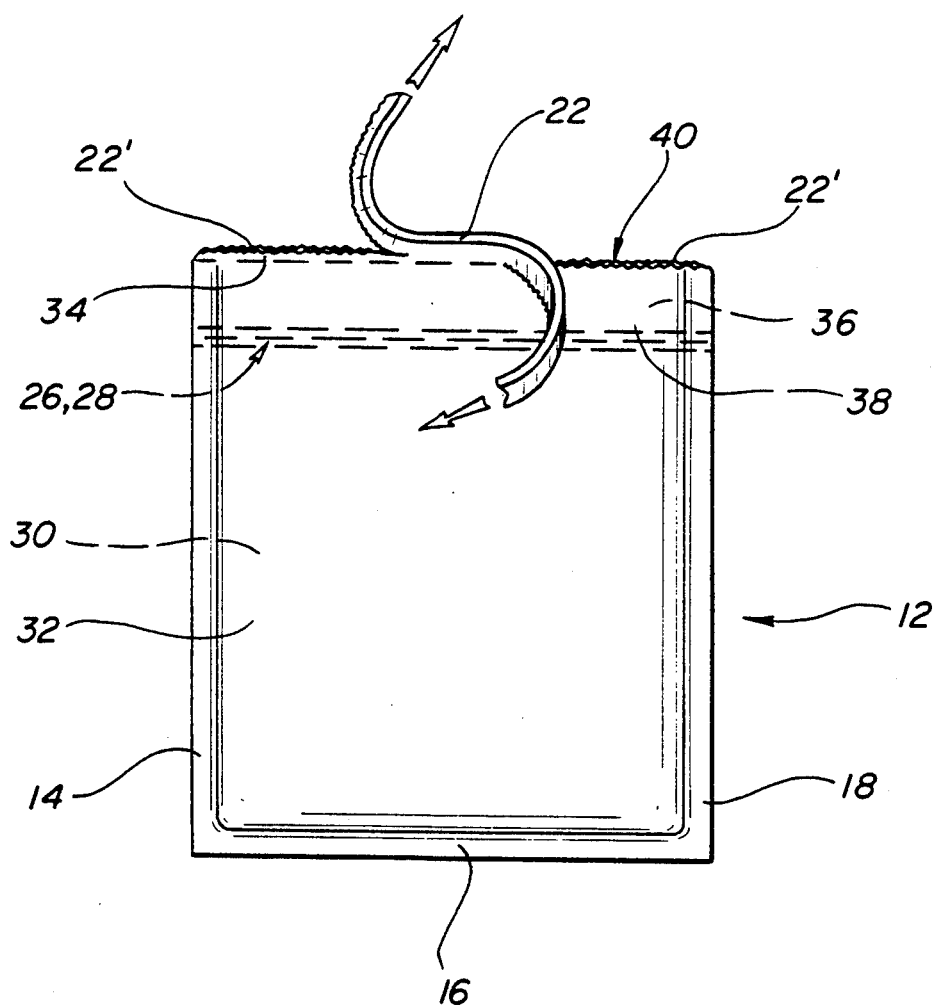

MODIFIED ZIPPER ELEMENTS FOR EASY OPEN CONTAINERS

BACKGROUND OF THE INVENTION

The present invention relates to improvements in flexible containers, and in particular, to modifications of the zipper elements for an easy open container.

Recloseable, flexible containers are well-known in the art. Such containers normally comprise a bag-like structure made from a folded web of thermoplastic film, and typically include interlocking male and female zipper elements fused, extruded or attached to the bag side walls. The bag-like structure is created when the thermoplastic film is folded, severed and sealed along its side edges. The zipper elements are positioned on the opposing bag side walls and close to seal the bag mouth.

Because recloseable, flexible containers are, by definition, accessible, positive means to completely seal the bag mouth have been developed to preserve freshness, prevent accidental opening, and inhibit intentional tampering. In turn, means to open such sealed containers have also been developed. For example, tear strips are known which comprise weakened lines for tearing across sealed webs to gain access to the mouth of the bag. Naito, U.S. Pat. No. 3,198,228 and Uramoto, U.S. Pat. No. 3,780,781 (the '781 patent) both show tear strips having such weakened regions.

Problems have arisen, however, in the use of containers having weakened regions for tear lines. Such problems include consumers' inability to tear the thermoplastic material; the need, despite the weakened regions, to use scissors to open the container, obviating the value of the tear strip; and irregular tearing down the bag lips, which compromises the strength, shape and operation of the zipper elements. Modifications, such as the inclusion of perforations along the weakened lines of tearing, have enhanced the efficacy of tear strips, but eliminate the airtight and tamper-proof features desired in completely sealing the mouth in such containers.

Other tear strips comprised of a thin thread or string of fiber placed within the container at its top are shown by Staller, U.S. Pat. No. 3,543,343, as a means to open sealed containers along a single tear line. The drawback of such tear strips is that the tear line may deviate from the top of the bag and propagate into the zipper elements, again compromising their strength, shape and operation. In an apparent effort to avoid such problems, Uramoto, in U.S. Pat. No. 3,827,427 (the '427 patent), defines two tear lines, one on each lip of the bag mouth, between pairs of ribs. Further development is needed, however, to improve the design of tear strips for the easy opening of sealed flexible containers of thermoplastic material.

SUMMARY OF THE INVENTION

The present invention meets that need by providing an improved means for easy opening of sealed flexible containers. In the present invention, a tear strip comprised of a bead of thermoplastic material is provided to define a tear line generally along the top edge of the flexible container. The tear strip may be extruded into the thermoplastic film or extruded separately and then attached to the surface thereof. The irregular tearing of flexible containers which has been experienced with tear strips in prior art devices is limited in the present invention by extending the bases of the zipper elements upward towards the top of the flexible container along both of the bag lips. Because of the length and additional reinforcement provided by the extended bases, a tear line propagating and deviating down the bag lips will stop when encountering the extended bases and will continue generally in the intended direction of tearing across the mouth to open the container without compromising, tearing, or distorting the interlocking zipper elements.

The extended bases of the present invention do not comprise weakened regions which define the primary tear lines for opening the bag. Rather, the extended bases provide safe boundaries to contain irregular tearing to facilitate the use of a tear strip along the top edge of the container. As well the side walls or bag lips remain intact and are not selectively weakened.

The present invention solves the tearing problems encountered with prior art devices without requiring multiple elements or ribs. Instead, a simple one-piece extended base is provided in the present invention which both limits the tear line and supports the zipper elements. The extended bases are attached to the thermoplastic film, and the zipper elements are attached to the extended bases, by any of the full range of methods available in the art, such as fusion, welding, bonding, extrusion or adhesion.

Once the container is opened, the extended bases of the zipper elements described above may function as grip strips and may be embossed, or include ribs, ridges, embedded particles, or similar gripping surfaces. Other features may be added to the container design such as sealed notches near the top edge of the flexible container, but below the tear strip, to facilitate initial propagation of the tear line. Similarly a pattern of one or more sealed apertures may be placed below the tear line to encourage propagation of the line adjacent to the tear strip without compromising the airtight nature of the container.

A method for making the present invention is also provided wherein a source of thermoplastic film is provided; extended bases are extruded, spaced apart and fused thereto; zipper elements and a tear strip are extruded; the zipper elements fused to the extended bases; and the tear strip fused to the thermoplastic film in a space between the extended bases. Thereafter the film is folded severed and sealed to provide an easy-open flexible container.

Accordingly, it is an object of the invention to provide an easy open flexible container wherein a simple tear strip may be used without Compromising the interlocking zipper elements of the flexible container. It is a further object of the invention to provide a means for making such an easy-open flexible container.

BRIEF DESCRIPTION OF DRAWINGS

FIG. 5 shows the various ways to use the tear strip in the preferred embodiment to open the flexible container.

DETAILED DESCRIPTION OF THE PREFERRED EMBODIMENT

Figure 1:
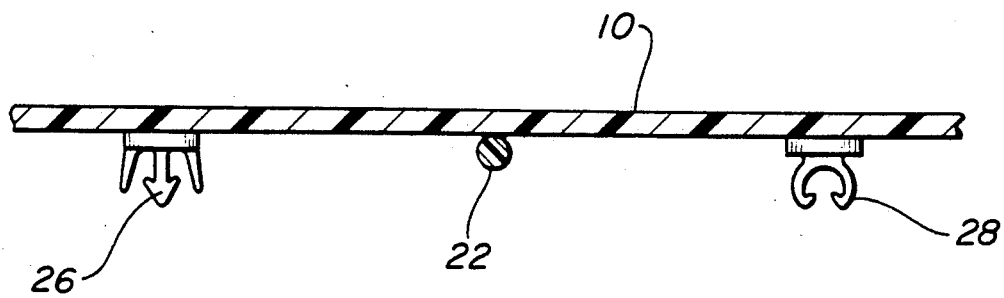
FIG. 1 is a cross-sectional view of thermoplastic film as used in the prior art to make sealed flexible containers.
Figure 2:
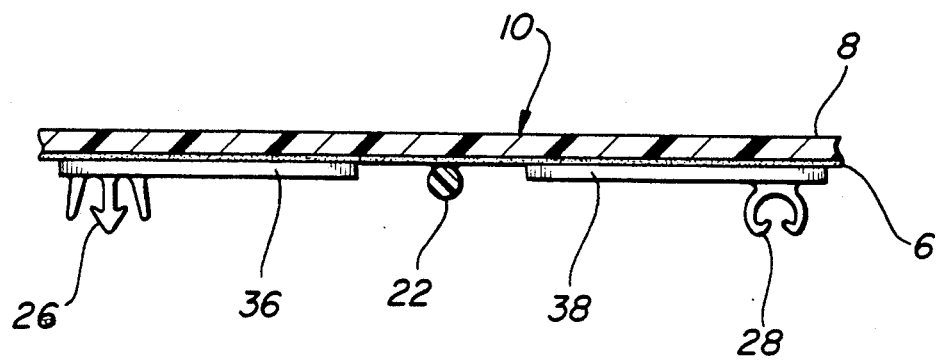
FIG. 2 is a cross-sectional view of the preferred thermoplastic film of the present invention.
Figure 3:
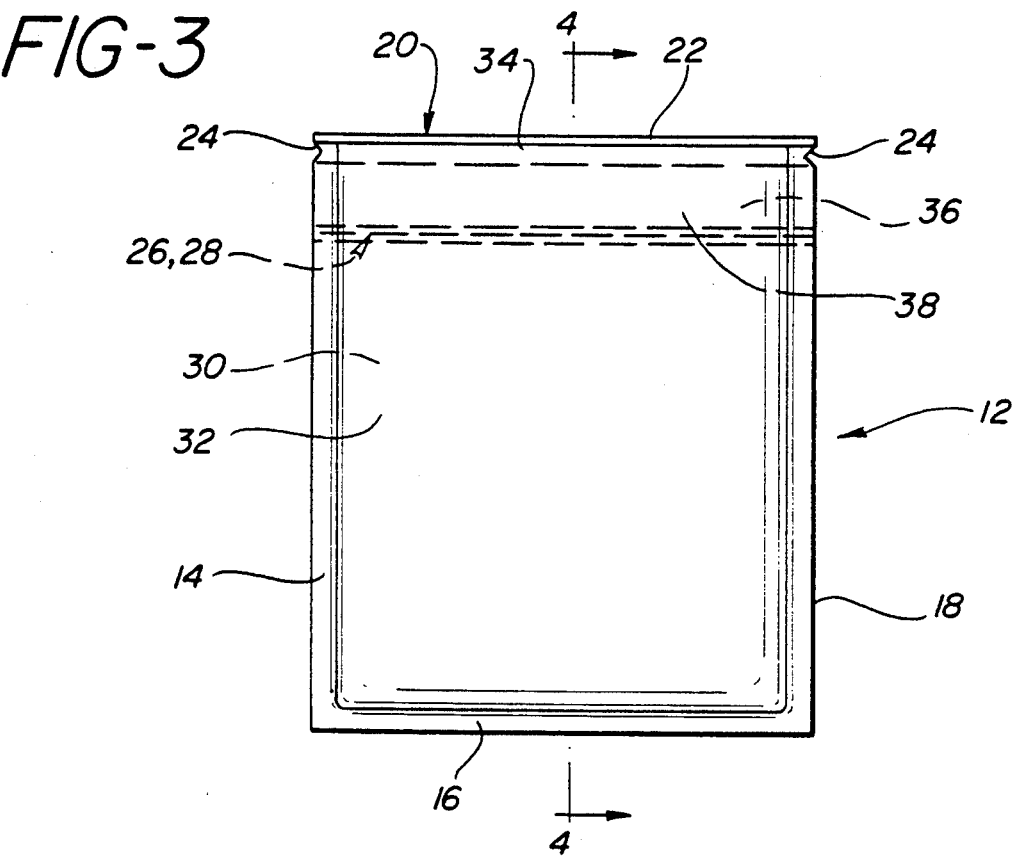
FIG. 3 is an easy-open, sealed flexible container made of the thermoplastic film shown in FIG. 2.

FIG. 1 shows thermoplastic film 10 from which containers are made in the prior art. FIG. 2 shows the improved design of the present invention. When the thermoplastic sheet material of FIG. 2 is folded, severed and sealed, the flexible container 12 of the present invention results, as shown in FIG. 3. As seen in FIG. 3, container 12 has sealed edges 14, 16, and 18. Upper edge 20 is formed by folding, and tear strip 22 is located therein as further shown in FIG. 4A. Preferably, sealed notches 24 shown in FIG. 3 are included to aid consumers in opening container 12 with tear strip 22. Notches 24 are sealed around their edges to maintain the airtight integrity of container 12. Once opened, the remaining bag-like portion of container 12 may be reclosed and resealed by mean of interlocking zipper elements 26 and 28 located on side walls 30 and 32. Extended bases 36 and 38 shown in FIGS. 3 and 4A, reinforce thermoplastic film 10, and serve to limit the tearing of thermoplastic film 10 by tear strip 22 to the lip areas 34 of side walls 30 and 32 above bases 36 and 38. Extended bases 36 and 38 thereby protect interlocking zipper elements 26 and 28 from damage upon opening container 12. Extended bases 36 and 38 may, alternately be termed base layers, reinforcing strips or even enlarged grip strips, but, having the characteristics and advantages described, are herein referred to as extended bases.

Figure 4A:
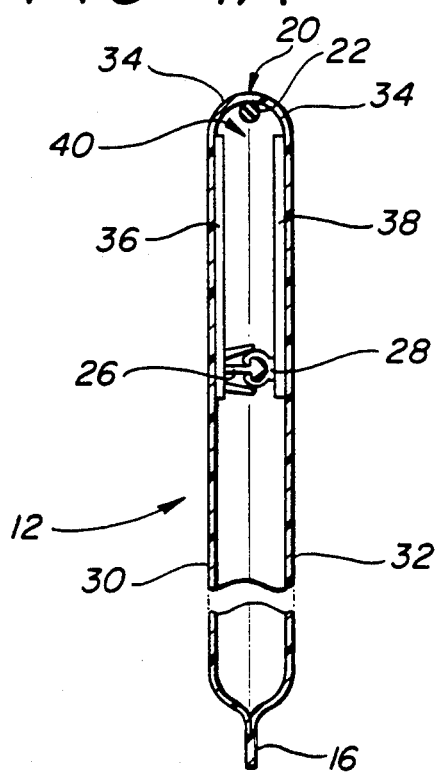
FIG. 4A is an enlarged cross-sectional view of the preferred embodiment of FIG. 3 taken along line 4—4.

In the preferred embodiment of FIG. 4A, the thermoplastic film 10 of FIG. 2 is preferably a multi-layer sheet comprising an outer barrier layer 8 of two to five mils thick polypropylene, polyester or Saran (polyvinylidene chloride), and a sealant layer 6 of one to three mil thick polyolefin or adhesive. The extended bases 36 and 38, zipper elements, 26 and 28, and tear strip 22 are preferably made of a low density polyethylene. As shown in FIG. 4A, the tear strip 22 may be formed as a bead of thermoplastic material fused, welded, bonded, adhered, or attached by other known means, onto the inside of upper edge 20 of container 12. Preferably extruded and fused onto the surface of film 10, tear strip 22 is of sufficient thickness to be stronger than the thermoplastic film 10.

As also shown in FIG. 4A, extended bases 36 and 38 may similarly be fused, welded, bonded, adhered, extruded or attached by other known means to the inside of side walls of 30 and 32. Preferably, extended bases 36 and 38 are separate extrusions two to three mils thick which are fused onto side walls 30 and 32, and zipper elements 26 and 28 are separate extrusions which are then fused onto extended bases 36 or 38. As such, the construction of the preferred embodiment involves a simple manufacturing process relative to more complex prior art devices. Alternatively, extended bases 36 and 38 and zipper elements 26 and 28 may be an integral extrusion of extended bases and zipper together, which integral extrusion may then be fused onto thermoplastic film 10.

Figure 4B:
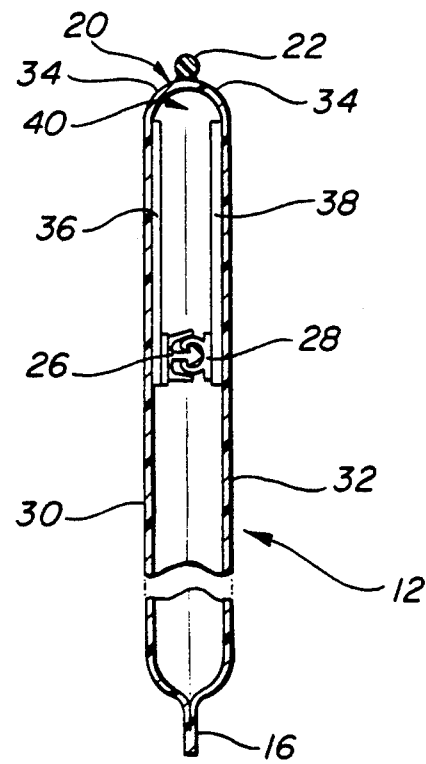
FIG. 4B is an enlarged cross-sectional view of an alternative embodiment of the present invention, taken along line 4—4 of FIG. 3.

The alternative embodiment of FIG. 4B shows an embodiment wherein tear strip 22 is, representatively, shown outside of container 12. Tear strip 22 could also function with the other elements shown if located inside of container 12. Extended bases 36 and 38 and zipper elements 26 and 28 are, as before, separate extrusions. However, as shown in FIG. 4B, zipper elements 26 and 28 include short bases which short bases are later fused, welded or similarly attached by known means to extended bases 36 and 38.

Figure 6:
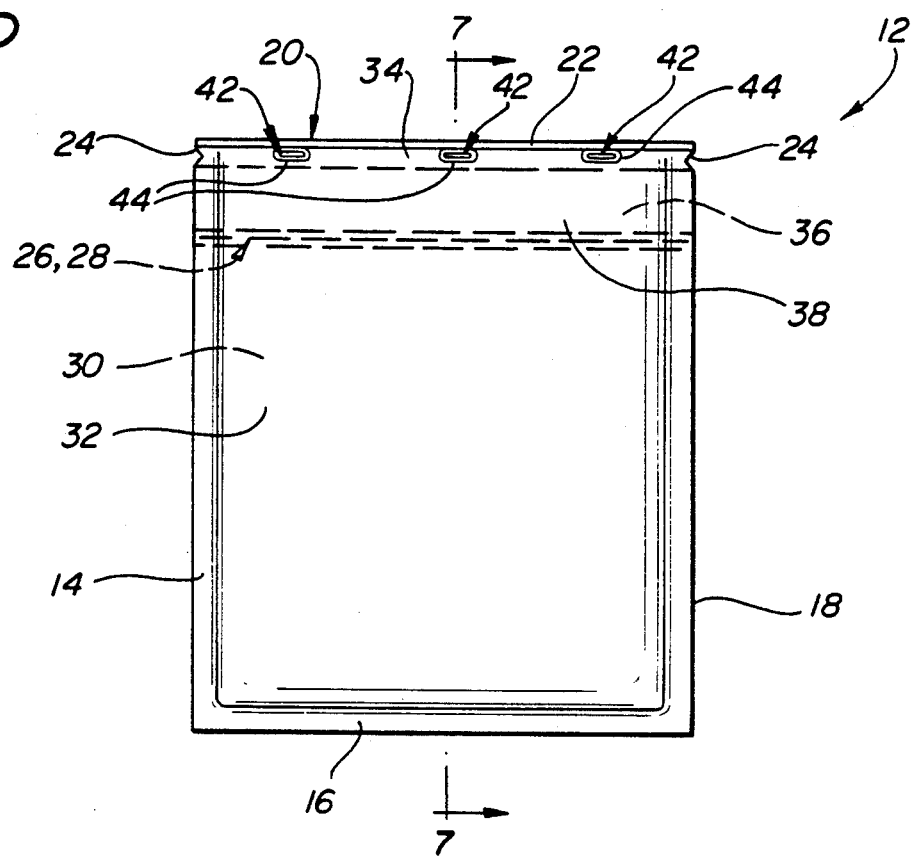
FIG. 6 is a sealed flexible container showing sealed apertures to facilitate the use of the tear strip.
Figure 7:
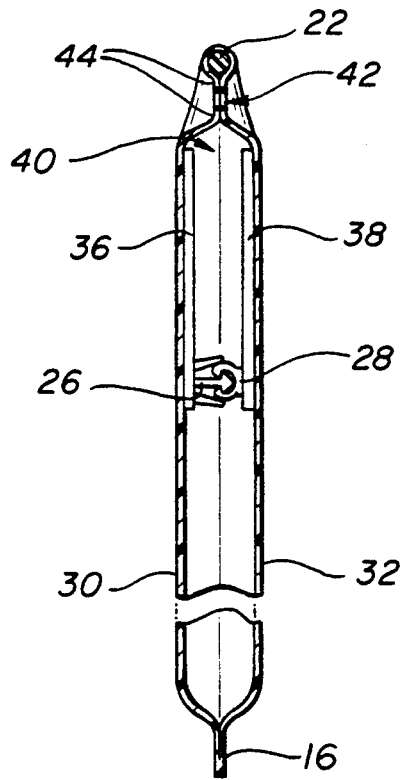
FIG. 7 is an enlarged cross-sectional view of the embodiment of FIG. 6 taken along line 7—7.

As seen in FIG. 5, the present invention permits tear strip 22 to be pulled through generally the entire range of motion—up, generally down, and sideways—to open container 12. Any tendency for tear line 22' to propagate or deviate down lips 34 is inhibited by bases 36 and 38, avoiding injury to zipper elements 26 and 28. Moreover, extended bases 36 and 38 sufficiently reinforce lips 34 and side walls 30 and 32 that lateral tearing forces result in a clean tear across the mouth 40 of flexible container 12. Once opened, extended bases 36 and 38 may function as grip strips, and may be embossed, or include ribs, extruded ridges, embedded particles or similar means to provide gripping surfaces. Finally, as shown in the alternative embodiment of FIGS. 6 and 7, additional sealed apertures 42 intermediate between edge seals 14 and 18 may be provided to further guide tear line 22' (not shown) across mouth 40. The sealed edges 44 of apertures 42 maintain the airtight integrity of container 12 while defining an excised area in the lips 34.

In a further aspect of the present invention, a method is provided for producing an improved, easy-open sealed flexible container 12. The preferred method comprises supplying a source of thermoplastic film 10, extruding the two extended bases 36 and 38 onto thermoplastic film 10 at a distance apart; attaching extended bases 36 and 38 thereto, preferably by applying pressure with a pair of rollers; thereafter extruding a means for tearing, such as a bead of thermoplastic material, onto thermoplastic film 10 in the space between the extended bases 36 and 38 and attaching the means for tearing 22 onto thermoplastic film 10; extruding at least one pair of interlocking zipper elements 26 and 28, and attaching mating ones of those zipper elements onto separate extended bases, and separating those zipper elements as far apart as practicable; folding thermoplastic film 10 generally along the line defined by said means for tearing 22 so as to bring into communication interlocking zipper elements 26 and 28; and thereafter sealing and severing the thermoplastic film 10 to define a sealed flexible container 12.

The method may further comprise the step of severing and sealing at least one notch 24 on at least one edge of flexible container 12 in the lip area 34 below the means for tearing 22 and above the extended bases 36 and 38. The method may also further include cutting sealed apertures 42 and the lip area 34 below the means for tearing and above the extended bases 36 and 38. In addition, the method may include the step of extruding means for gripping onto the extended bases 36 and 38, such means for gripping being ribs or ridges. As well, means for gripping may be applied to the extended bases such as by embossing a pattern on the surface of extended bases 36 and 38 or embedding particles therein.

The precise order in which extended bases 36 and 38 and means for tearing 22 are extruded and attached to thermoplastic film 10 is not critical, so that the means for tearing 22 may first be applied to thermoplastic film 10 after which extended bases 36 and 38 may be applied either side of means for tearing 22. In the preferred embodiment, extended bases 36 and 38 are first applied to thermoplastic film 10 after which zipper elements 26 and 28 are attached to extended bases 36 and 38. However, alternatively, extended bases 36 and 38 could have zipper elements 26 and 28 first applied thereto, after which extended bases 36 and 38 could be attached to the thermoplastic film 10. In this regard, zipper elements 26 and 28 could also, alternatively, be extruded with short bases which thereafter may be attached to extended bases 36 and 38 to result in the flexible container 12 shown in FIG. 4B.

In an alternative method, extended bases 36 and 38 and zipper elements 26 and 28 are an integral extrusion. In this alternative method, as well, integrally extruded bases 36 and 38 and zipper elements 26 and 28 may be attached to thermoplastic film 10 before or after means for tearing 22 is extruded and attached to thermoplastic film 10. The addition of means for gripping to extended bases 36 and 38 is also possible in the alternative method in similar fashion as described above.

While certain representative embodiments and details have been shown and described for purposes of illustrating the invention, it will be apparent to those skilled in the art that various changes in the device and method disclosed herein may be made without departing from the scope of the invention which is defined in the appended claims.

What is claimed is:

1. An easy-open flexible container comprising:
   a sealed bag body of thermoplastic film, said sealed bag body including opposing first and second side walls which meet to form at least one edge of said sealed bag body;
   means for tearing said thermoplastic film attached to said sealed bag body generally along one of said edges where said opposing first and second said walls meet, said means for tearing comprising a tear strip of thermoplastic material;
   first and second extended bases of thermoplastic material disposed on said opposing first and second side walls of said bag body, respectively, in spaced relationship from said tear strip; and
   at least one first and at least one second interlocking zipper elements disposed on said first and second extended bases, respectively, generally towards the ends of said first and second extended bases farthest from said means for tearing;
   the ends of said first and second extended bases nearest said tear strip defining boundaries beyond which said thermoplastic film may not be torn with said tear strip, thereby inhibiting damage to said zipper elements upon opening said container.

2. A flexible container as recited in claim 1 wherein said tear strip is fused onto said thermoplastic film.

3. A flexible container as recited in claim 1 wherein said tear strip comprises an extruded rib.

4. A flexible container as recited in claim 1 wherein said tear strip is on the inside of said sealed bag body.

5. A flexible container as recited in claim 1 wherein said tear strip is on the outside of said sealed bag body.

6. A flexible container as recited in claim 1 wherein said first and second extended bases are fused onto said thermoplastic film.

7. A flexible container as recited in claim 1 wherein said first and second zipper elements ar fused onto said first and second extended bases.

8. A flexible container as recited in claim 1 wherein said first and second extended bases are extruded onto said thermoplastic film.

9. A flexible container as recited in claim 1 wherein said first and second zipper elements include small bases which are attached to said first and second extended bases.

10. A flexible container as recited in claim 1 wherein at least one of said extended bases and said respective zipper elements are an integral extrusion.

11. A flexible container as recited in claim 1 wherein the surface of at least one of said first and second extended bases further comprises means for gripping said first and second side walls.

12. A flexible container as recited in claim 11 wherein said means for gripping comprises one or more extruded ribs.

13. A flexible container as recited in claim 1 further comprising at least one notch in said first and second side walls positioned below said tear strip and above said first and second extended bases, said notch having sealed edges, and said notch adapted to facilitate tearing of said thermoplastic film with said tear strip.

14. A flexible container as recited in claim 1 further comprising one or more sealed apertures in said first and second side walls positioned below said tear strip and above said first and second extended bases, said one or more sealed apertures adapted to facilitate tearing of said thermoplastic film with said tear strip.

15. A flexible container comprising:
   a sealed bag body of thermoplastic film, said sealed bag body including opposing first and second side walls which join to form at least one edge of said sealed bag body;
   means for tearing said sealed bag body attached to said sealed bag body generally along at least one of said edges formed by said first and second side walls where said thermoplastic film is to be torn;
   first and second extended bases of thermoplastic material disposed on the inside surfaces of said opposing first and second side walls of said sealed bag body, said extended bases in spaced relationship from said means for tearing, the ends of said extended bases nearest said means for tearing defining boundaries to limit tearing of said thermoplastic film with said means for tearing;
   interlocking first and second zipper elements disposed on said first and second extended bases, respectively, and positioned thereon, generally towards the ends of said extended bases farthest from said means for tearing, whereby said extended bases protect said interlocking zipper elements from damage from said means for tearing.

16. A flexible container as recited in claim 15 wherein said means for tearing comprises a bead extruded in said thermoplastic film.

17. A flexible container as recited in claim 15 wherein said first and second extended bases are fused onto said first and second opposing side walls.

18. A flexible container as recited in claim 15 wherein said first and second extended bases extruded onto said thermoplastic film.

19. A flexible container as recited in claim 15 wherein the surface of at least one of said first and second extended bases further comprises means for gripping said first and second opposing side walls.

20. A flexible container as recited in claim 19 wherein said means for gripping comprises at least one extended rib.

21. A flexible container as recited in claim 15 wherein said flexible container further comprises one or more sealed apertures in said first and second side walls in an area below said means for tearing and above said first and second extended bases, said one or more sealed apertures adapted to facilitate use of said means for tearing.

22. A flexible container as recited in claim 15 further comprising at least one notch in said first and second side walls below said means for tearing and above said first and second extended bases, said notch having sealed edges, and said notch adapted to facilitate tearing of said thermoplastic film with said means for tearing.

23. Reclosable means for a flexible container comprising:
thermoplastic film adapted to be folded, means for tearing said thermoplastic film attached to said thermoplastic film, in the area in which said thermoplastic film is to be folded,
first and second bag lips having first and second extended bases of thermoplastic material attached to said thermoplastic film, said first and second extended bases disposed on opposite sides of said means for tearing in spaced relationship therefrom;
interlocking first and second zipper elements on said first and second extended bases, respectively, said first and second zipper elements disposed generally towards the ends of said first and second extended bases farthest from said means for tearing, and spaced apart to enter into opposing interlocking relationship when said thermoplastic film is folded;
whereby said thermoplastic film may be folded generally along said means for tearing to form a top edge wherein said means for tearing is disposed, and serve as at least a portion of first and second said walls of a reclosable flexible container.

24. Reclosable means for a flexible container as recited in claim 23 wherein said means for tearing is a tear strip comprising a rib of extruded thermoplastic material.

25. Reclosable means for a flexible container as recited in claim 23 wherein said first and second extended bases are spaced generally equally from said means from tearing.

26. Reclosable means for a flexible container as recited in claim 23 wherein said first and second zipper elements are disposed generally equally from said means for tearing, and said means for tearing is disposed generally along said top edge when said thermoplastic film is folded.

27. A reclosable means for a flexible container as recited in claim 23 wherein said thermoplastic film is folded to form first and second side walls of a reclosable flexible container.

28. A reclosable means for a flexible container as recited in claim 27 wherein said first and second side walls are sealed together along one or more lines defining the periphery of a flexible container.

29. A reclosable means for a flexible container as recited in claim 23 wherein said means for tearing is disposed on the same surface of said thermoplastic film as said first and second extended bases.

30. A reclosable means for a flexible container as recited in claim 23 wherein at least one of said first and second extended bases are integral extrusions with said first and second zipper elements, respectively.

31. A reclosable means for a flexible container as recited in claim 23 wherein at least one of said first and second extended bases further comprise means for gripping.

32. A reclosable means for a flexible container as recited in claim 23 wherein said thermoplastic film is folded and attached to first and second opposing side walls of a bag body of a flexible container.

33. A reclosable means for a flexible container comprising:
a thermoplastic film adapted to be folded and serve as at least a portion of a flexible container;
said thermoplastic film having a means for tearing attached thereto in the area of said thermoplastic film to be folded;
said thermoplastic film extending from said means for tearing to define first and second bag lips respectively;
first and second extended bases disposed on said first and second bag lips and spaced apart from said means for tearing; and
interlocking first and second zipper elements on said first and second extended bases, disposed towards the ends thereof farthest from said means for tearing, for closing said first and second bag lips;
wherein said thermoplastic film is adapted to be folded and attached to first and second opposing side walls of a bag body to form an easy-open and reclosable portion of said flexible container.

34. A reclosable means as recited in claim 33 wherein said means for tearing is a tear strip comprising a thermoplastic bead extruded onto said thermoplastic film adapted to be folded.

35. A reclosable means for a flexible container as recited in claim 33 wherein said first and second extended bases are spaced generally equally from said means from tearing.

36. A reclosable means for a flexible container as recited in claim 33 wherein said first and second zipper elements are disposed generally equally from said means for tearing, and said means for tearing is disposed generally along said top edge and said thermoplastic film is folded.

37. A reclosable means for a flexible container as recited in claim 33 wherein said means for tearing is disposed on the same surface of said thermoplastic film as said first and second extended bases.

38. A reclosable means for a flexible container as recited in claim 33 wherein at least one of said first and second extended bases further comprise means for gripping.

39. A flexible container as recited in claim 1 wherein said first and second extended bases are spaced generally equally from said means for tearing.

40. A flexible container as recited in claim 1 wherein said first and second zipper elements are disposed generally equally form said means for tearing.

41. A flexible container as recited in claim 1 wherein said means for tearing is attached generally along the fold line of a folded edge where said first and second side walls meet.

42. A flexible container as recited in claim 15 wherein said first and second extended bases and said first and second zipper elements are disposed generally parallel to said means for tearing.

* * * * *